United States Patent
Barbieri et al.

(10) Patent No.: US 10,621,642 B2
(45) Date of Patent: Apr. 14, 2020

(54) RECOMMENDER SYSTEM AND METHOD FOR STIMULATING A USER TO RECOMMEND AN ITEM TO A CONTACT OF THE USER

(75) Inventors: Mauro Barbieri, Eindhoven (NL); Serverius Petrus Paulus Pronk, Vught (NL); Jan Korst, Eindhoven (NL)

(73) Assignee: FUNKE DIGITAL TV GUIDE GMBH (DE)

( * ) Notice: Subject to any disclaimer, the term of this patent is extended or adjusted under 35 U.S.C. 154(b) by 0 days.

(21) Appl. No.: 13/879,754

(22) PCT Filed: Nov. 23, 2011

(86) PCT No.: PCT/EP2011/070841
§ 371 (c)(1),
(2), (4) Date: Apr. 16, 2013

(87) PCT Pub. No.: WO2012/069548
PCT Pub. Date: May 31, 2012

(65) Prior Publication Data
US 2013/0204740 A1 Aug. 8, 2013

(30) Foreign Application Priority Data

Nov. 23, 2010 (EP) .................................... 10192273

(51) Int. Cl.
*G06Q 30/00* (2012.01)
*G06Q 30/06* (2012.01)
*G06Q 30/02* (2012.01)

(52) U.S. Cl.
CPC ......... *G06Q 30/0631* (2013.01); *G06Q 30/02* (2013.01); *G06Q 30/0609* (2013.01); *G06Q 30/0613* (2013.01); *G06Q 30/0641* (2013.01)

(58) Field of Classification Search
CPC ................. G06Q 30/0601–0645; G06Q 30/08
(Continued)

(56) References Cited

U.S. PATENT DOCUMENTS 7,113,917 B2 * 9/2006 Jacobi et al. ............... 705/14.53
2006/0085818 A1 * 4/2006 Bodlaender et al. ........... 725/46
(Continued)

FOREIGN PATENT DOCUMENTS

| CN | 101556622 A | 10/2009 |
| EP | 1518407 A1 | 3/2005 |
| WO | 2006/104694 A2 | 10/2006 |

OTHER PUBLICATIONS

Constine, Josh, Amazon Recommends Products based on your and your friends' facebook interests, Jul. 27, 2010, AdWeek accessed at [https://web.archive.org/web/20170617040814/https://www.adweek.com/digital/amazon-facebook-recommendation/] (Year: 2010).*
(Continued)

*Primary Examiner* — Jeffrey A. Smith
*Assistant Examiner* — Lindsey B Smith
(74) *Attorney, Agent, or Firm* — Ware, Fressola, Maguire & Barber LLP (57) ABSTRACT

The present invention is related to a recommender system (100), a computer-implemented recommending method, a corresponding computer readable medium and a corresponding computer program. A recommender system (100) is configured to send an electronic suggestion signal (186) to a respective user (199) of a user database (140) in dependence of a first like-degree (164) of a specific item, which has been determined based on items that the respective user has already recommended to his contacts. The electronic suggestion signal (186) suggests the respective user (199) to recommend the specific item to one or more of his contacts (198). In this way, personal based recommendations (188) are stimulated.

14 Claims, 4 Drawing Sheets

(58) Field of Classification Search
USPC .............................................. 705/26.1–27.2
See application file for complete search history.

(56) References Cited

U.S. PATENT DOCUMENTS

| | | | | |
|---|---|---|---|---|
| 2006/0224446 A1* | 10/2006 | Fox | ................................ | 705/14 |
| 2007/0203790 A1* | 8/2007 | Torrens et al. | ................. | 705/14 |
| 2008/0077575 A1* | 3/2008 | Tateno et al. | ..................... | 707/5 |
| 2008/0103971 A1* | 5/2008 | Lukose et al. | .................. | 705/40 |
| 2008/0189274 A1* | 8/2008 | Mann | ............................... | 707/5 |
| 2008/0243733 A1* | 10/2008 | Black | ............................. | 706/16 |
| 2008/0255934 A1* | 10/2008 | Leventhal et al. | .............. | 705/14 |
| 2009/0006398 A1* | 1/2009 | Lam et al. | ........................ | 707/7 |
| 2009/0259621 A1* | 10/2009 | Svendsen et al. | ................ | 707/3 |
| 2010/0042471 A1* | 2/2010 | Chang et al. | ................... | 705/10 |
| 2010/0144426 A1* | 6/2010 | Winner | ................... | G07F 17/32 463/25 |

OTHER PUBLICATIONS

Rumi Ghosh et al; "Predicting Influential Users in Online Social Networks;" Proceedings of KDD workshop on Social Network Analysis (SNA-KDD), Washington, DD; May 26, 2010; whole article.

V. Pronk, et al; "Incorporating Confidence in a Naive Bayesian Classifier;" Lecture Notes in Computer Science, vol. 3538/2005; 2005; pp. 327-336.

David Goldberg, et al; "Using collaborative filtering to weave an information tapestry;" Communications of the ACM archive, vol. 35, Issue 12; Dec. 1992; special issue on information filtering; pp. 61-70.

* cited by examiner

Fig. 4

RECOMMENDER SYSTEM AND METHOD FOR STIMULATING A USER TO RECOMMEND AN ITEM TO A CONTACT OF THE USER

CROSS REFERENCE TO RELATED APPLICATIONS

This application is the U.S. National Stage of International Application Number PCT/EP2011/070841 filed on Nov. 23, 2011 which was published in English on May 31, 2012 under International Publication Number WO 2012/069548 which in turn claims priority under 35 USC § 119 to European Patent Application No. 10 192 273.0 filed on Nov. 23, 2010, which applications are hereby incorporated by reference in their entirety.

FIELD OF INVENTION

The invention relates to a recommender system for stimulating a user of a computer based network to recommend an item to a contact of the user, a computer-implemented recommending method, a computer readable medium and a computer program. In particular, the invention relates to user-endorsed recommendations in social networks.

BACKGROUND OF THE INVENTION

Recommender systems are becoming a popular tool to present a product and/or a service, i.e. an item, to a user from a vast amount of items available online, such as real products, online articles, video content and so forth, in which the user is actually likely to be interested.

In that context, European patent specification EP 1 518 407 B1 discloses a method for improving the performance of a recommender system. The performance of the recommender system is improved by updating a respective user profile in dependence of user feedback. The method only accepts feedback that does not degrade performance of the recommendation system and measures the performance of the recommendation system by an error rate. Feedback that would degrade performance is discovered without being employed to alter the user profile. The recommendation system described in EP 1 518 407 B1 is only configured to transmit recommendations directly to a user.

United States patent application publication US 2010/0042471 A1 describes a software and a hardware facility for managing the referral of electronic advertisements. The facility provides advertisements to a referrer and shall enable the referrer to forward the advertisements to recipients. The facility is supposed to track recipient responses to the forwarded advertisements, e.g., interactions with the advertisement. It is disclosed that the facility would provide incentives and/or disincentives to referrers based on recipient responses to advertisements.

International patent application publication WO 2006/104694 describes a system for member-created advertisement in a member network. A member of the member network can submit a request to the system in order to receive support from the system with respect to creating and sending an advertisement.

SUMMARY OF THE INVENTION

It is an object of the present invention to provide an improved recommender system that supports providing personal recommendations. It is furthermore an object of the present invention to provide a corresponding computer-implemented recommending method, a computer readable medium and a computer program.

In a first aspect of the present invention, a recommender system for stimulating a user of a computer based network to recommend an item to a contact of the user is presented, wherein the recommender system comprises:
- an access to at least one of a number of item databases,
- a user database for storing a plurality of user profiles, wherein a respective user profile comprises:
  - at least a link to a contact database, the contact database associating contacts of the user to recommended items wherein a respective contact is associated to a number of recommended items that each have been recommended by the user to the respective contact,
  - a like-degree determiner for determining a first like-degree for a specific item from one of the number of item databases based on the recommended items,
  - a recommender engine in the form of an automatic apparatus, the recommender engine comprising
    - a signal generator configured to generate an electronic suggestion signal and
    - a sender configured to send the generated suggestion signal to the respective user, if the first like-degree exceeds a fixed level, the electronic suggestion signal indicating potential interest of a respective contact of the respective user in the specific item.

The invention includes the recognition that conventional recommendation systems, such as disclosed in EP 1 518 407 B1, are only configured to send recommendations for certain items directly to users. However, a user typically trusts his contacts/friends more than he trusts a recommendation system. A recommendation from a user to one of his contacts/friends is usually rated higher in importance and relevance by the contact/friend than a recommendation made by a machine, no matter how accurate or relevant the actual recommendation is.

The inventors have recognized that advertises are increasingly faced with a crowed advertising space in which consumers' attention is spread across more and more channels packed with commercial messages. While advertisers strive for viewers' attention, users are becoming accustomed to choose what to watch and what to read and they do not tolerate advertisements that are of no interest to them. The inventors have furthermore discovered that personal recommendations can help advertisers to reach and to obtain the attention of users while, at the same time, they can satisfy a user need to filter out unwanted information and get recommendations for items that matter to them.

Advertisers can now be provided with the recommender system of the first aspect of the present invention that technically implements stimulation of personal recommendations.

One advantage of the recommender system of the present invention is that it generally avoids sending recommendations directly to a user, but instead sends an electronic suggestion to a user which suggests the user to recommend a specific item to one of its contacts. Therefore, the recommender system delivers advantages of personal recommendations, in particular highly effective advertisements, to an advertiser with technical means.

The recommender system facilitates communication between users or, respectively, between a user and a contact, by providing a semi-automatic approach that allows for user control of the last step, namely: actually sending a recommendation, while everything else, in particular sending the electronic suggestion signal, that is to say: the stimulation, occurs fully automatic. The recommender system therefore technically effects spread of personal recommendations in the form of electronic notifications signals, such as e-mail or other electronic visual prompts. In particular, the present invention provides technical means for supporting the discovery of such content items that are not liked by the user, but that are instead of potential interest to one of his friends/contacts.

For instance, the like-degree determiner determines the first like-degree by comparing an item with the profile of a contact, in particular, to a profile that is based upon items recommended earlier to this contact by the user. In other words, the user (user A) is suggested to recommend an item to the contact (user B), wherein this suggestion is based on a profile of user B that has been implicitly created by user A, namely based on earlier recommendations user A has done for user B. The suggestion signal is sent only if the similarity, i.e. the like-degree, is sufficiently large.

The like-degree expresses a potential interest of a respective contact, based on the profile that the user has of this respective contact. Therefore, it is inferred from the profile of the contact that the user has of this contact that the specific item may be of interest for or liked by this contact. The like-degree of an item (i.e. the potential interest) can be determined by calculating a degree of similarity, based on data collected earlier. The like-degree is thus a property that is determined by a technical system.

In a preferred embodiment, the recommender engine is coupled to the like-degree determiner. In this embodiment, the like-degree determiner comprises a comparator for comparing a determined first like-degree of the specific item with the fixed level and generating a comparison result signal. The like-degree determiner is configured to trigger the signal generator of the recommender engine with the comparison result signal, if the comparison result signal indicates that the determined first like-degree is greater than or equal to the fixed level. For instance, the comparison result signal is a binary signal, wherein positive comparison result signal, for instance a logical "1", indicates that the determined first like-degree is greater than or equal to the fixed level and a negative comparison result signal, for instance a logical "0", the other case. Upon receiving such positive comparison result signal, the signal generator generates the electronic suggestion signal that comprises an item identification of the specific item and a contact identification of the respective contact. For instance, the electronic suggestion signal defines a visual prompt identifying the respective contact and the specific item. After generation of the electronic suggestion signal, the signal generator triggers the sender to send the generated electronic suggestion signal to the user.

The recommender system can be applied to internet-enabled TV sets, internet services including video and music services, computer based networks, in particular social networks, online advertising systems, advertising management systems, personal video recorder sets, set-top boxes and audio systems including portable audio systems.

The recommender system of the present invention stimulates a user of a computer based network, such as a social network like facebook.com or derivatives, to recommend an item to a contact of the user by sending a corresponding electronic suggestion signal to a respective user.

Within the scope of the description of the present invention, the term "item" refers to real or virtual objects, the recommender system and/or the users of the computer based network rate and interact with. Items can be, for instance, video content, advertisements, online articles, web pages, physical or virtual products such as books, DVDs, electronic products, TV shows, magazine subscriptions, basically everything that is available on/over the internet. Such items are registered or, respectively, stored in at least one of a number of items databases, such as amazon.com or youtube.com, to which the recommender system has an access. An item database can be, for instance, a static item database, like a data base of a product or service provider like amazon.com or youtube.com or nytimes.com. An item database can also be a dynamic item database. In particular, such a dynamic item database can be a plurality of items that is currently displayed in an internet browser of a specific user of the user database.

The recommender system preferentially comprises accesses to a plurality of item databases. "Item" can also mean an item group. A "specific item" is an item that is potentially suggested to be recommended by a user to a contact. To name some examples, the specific item can be an item that has been added to one of the number of item databases, an item that has been rated by the respective user, an item that has been recommended to the user, or an item that has been found by the user while browsing or as a result of a keyword-based search.

Within the scope of the description of the present invention, the terms "contact" and "friend" are used as synonyms. In one regard, namely when a user sends a recommendation for an item to one of his friends/contacts, both terms refer to a person that has some kind of a relation to the user. For instance, within facebook.com, that person is called a "friend". In a local address book of the user's computer, such person is referred to as "contact". Technically speaking, in respect to the contact database, both terms refer to corresponding contact information about such person. A contact is identified as such by its contact information.

In particular, it shall be understood that a contact can also be a user of the computer based network and that a contact can be registered with a corresponding user profile in the user database of the recommender system. Furthermore, a recommendation from a user to one of his contacts/friends is also referred to as "personal recommendation" within the scope of the description of the present invention. It shall be understood that such personal recommendation generally occurs by sending a corresponding electronic message.

The user database comprises at least the link to the contact database, which lists contacts of the user and associates each of them to a number of recommended items that each have been recommended by the user to the respective contact and therefore are called "recommended items" within the scope of the description of the present invention. The association between contacts, that is: contact information, and recommended items, that is: information designating recommended items, can be implemented such that contacts and respective recommended items are listed in the contact database, for instance in the form of a table. The association can also be implemented such that the contact database includes a list of contacts of the respective user and a list of corresponding links pointing to profiles of the contacts, which can also be user profiles as described above. The contact profiles then contain respective recommended items, which have been recommended from the user to the contact.

The contact data base contains and delivers information to the recommender system that expresses another user's view of a contact, who can also be a user of the computer based network. The fact that a user recommends a certain item to one of its contacts reveals the user's knowledge about certain preferences of that contact. The recommender system identifies this knowledge and uses it for automatic stimulation of personal recommendations.

The wording "at least a link to a contact database" is to be understood such that the user database is, in one embodiment, also configured to include the contact database itself. In another embodiment, the contact database is stored elsewhere. In the latter case, the user database comprises the link to the contact database.

The contacts of a user might be the contacts of the local address book of the user or the contacts of a social network like facebook.com or linkedin.com or other users that are somehow connected to the respective user.

The like-degree determiner of the recommender system can be a standard like-degree determiner known to the man skilled in the art.

Determining the like-degree for a specific item based on the recommended items generally means to determine a value in dependence of the similarity between the specific item and the recommended items, the value indicating a degree to which a contact may like the specific item. The like-degree determiner is, for instance, configured to make use of available meta-data related to items and thus preferably is configured to access a metadata database containing item related meta-data. The like-degree determiner can also make use of collaborative filtering.

A standard like-degree determiner based on meta-data is, for instance, known from V. Pronk et al.: "*Incorporating confidence in a naive Bayesian classifier*" in Lecture Notes in Computer Science, 2005, Volume 3538/2005, 317-326, DOI: 10.1007/11527886_41.

A standard like-degree determiner based on collaborative filtering is, for instance, known from D. Goldberg et al.: "*Using collaborative filtering to weave an information tapestry*" Communications of the ACM archive, Volume 35, Issue 12 (December 1992), Special issue on information filtering, Pages: 61-70, Year of Publication: 1992, ISSN: 00010782. If the first like-degree exceeds the fixed level the sender of the recommender engine sends the generated electronic suggestion signal to the respective user. Thereby, a user is encouraged to send a recommendation to one of his contacts, who is likely to have interest in the specific item.

The electronic suggestion signal can be in the form of an electronic message, such as an e-mail or an electronic visual prompt or electronic written notification. Such message can appear to the respective user while browsing through the internet. An internet browser of the respective user can be equipped with a corresponding plug-in.

The fixed level can for instance be a fixed threshold or, respectively, the fixed level is a current average of a plurality of determined first like-degrees, each of the plurality of first like-degrees belonging to one of the contacts of the respective user. In the latter case, the recommender system is configured to select a minimum number of users to which electronic suggestion signal shall be provided, namely those, whose contacts exhibited the higher first like-degrees. It is furthermore preferred that the recommender system is configured to refine the selected minimum number of users by choosing such users, who are considered to be influential users. Such users can be those, who have a comparatively high number of contacts and/or those, who frequently send personal recommendation and/or those, whose associated contact database have been most recently updated. For determining such influential user, the recommender system is preferentially adapted to implement a method described by R. Gosh et al.: "Predicting Influential Users in Online Social Networks", Proceedings of KDD workshop on Social Network Analysis (SNA-KDD), Washington D.C., USA, 2010.

In the following, further embodiments of the recommender system of the first aspect of the invention are described. The additional features of the further embodiments may be combined with each other for the sake of generating other embodiments, as far as they are not explicitly described as being alternative to each other.

In a particularly preferred embodiment, the recommender system comprises a recommending detector configured to detect that a respective user of the user database has recommended an item to one of his contacts, wherein the recommender system is configured to update the contact database in dependence of the recommendation. Therefore, the likelihood that the electronic suggestion signal is misplaced is reduced. It shall be understood, that the recommender system is preferably configured to update contacts which have received a recommendation from a user and to update contacts, which have not received a recommendation. This allows providing a more exact view of the contacts and therefore an improved placement of the electronic suggestion signal.

Thus, it is preferred that the recommender system is configured to add non-recommended items to the contact database, if no recommendation occurs upon the electronic suggestion signal and mark these items as "non recommended", because these items were suggested for recommendation but were not recommended by the user.

Preferentially, the recommender system is configured to update the contact database in dependence of whether or not the user, which has been provided with the electronic suggestion signal, actually recommends the specific item to his contacts. If the user recommends the item to a contact, the recommender system adds the recommended item to the contact database with a positive rating to the respective contact that has received a personal recommendation. If no recommendation occurs upon reception of the electronic suggestion signal, the recommender system adds the non-recommended item to the contact database with a negative rating to a respective contact that has not received a personal recommendation. In this embodiment, the recommender system is thus configured to generate more accurate user views of their respective contacts and thus, electronic suggestions signals can be distributed such that chances for a following personal recommendation are increased.

Preferably, the recommender system comprises a rating detector configured to detect that a respective user of the user database has rated an item, wherein the like-degree determiner and the recommender engine employ said rated item as the specific item. This embodiment is particularly preferred, if the rated item has been rated positively.

In this embodiment, the recommender system recognizes that a user has rated an item and, if the rated item is determined by the like-degree determiner to have a high like-degree based on the recommended items that the user has already recommended to one of its contacts, suggests him to recommend the rated item to one of his contacts.

It is furthermore preferred, that the recommender system comprises an item detector configured to detect that a new item has been added to one of the number of item database, wherein the like-degree determiner in the recommender engine employs said new item as the specific item. For instance, if a new book is available on amazon.com, the recommender system checks—eventually after having recommended this new book to a user—whether this book exhibits a sufficient high like-degree to one of the contacts listed in the contact database, to which the user database has a link to or which can be part of the user database of the recommender system. If this criterion is met, the sender of the recommender system sends the electronic suggestion signal to the user. Thus, advertisers of the new items can take advantage of personal based recommendations by using the recommender system of the present invention.

It shall be understood that in preferred embodiment, the recommender system comprises a single detector that is configured to implement the functions of the rating detector, the item detector and the recommending detector described above.

In one embodiment of the recommender system, the user database additionally comprises user related information about user preferences in respect to items and that the signal generator is configured to generate the electronic suggestion signal in dependence of the user related information of the respective user.

This embodiment has the advantage that a user can in particular be stimulated by the recommender system to recommend such a specific item to one of his contacts, he himself is interested in. As a result, the actual recommendation is even more personalized and therefore more effective. Thus, in particular, such items are suggested by the recommender system for recommendation, which have a certain similarity to recommended items and which the potential recommender has a certain personal relationship to. The actual recommendation made by the user to his contact is therefore well placed, as firstly: the contact is likely to have interest in the recommended item and secondly: the recommending user has a personal relationship to the specific item he recommends.

In this embodiment, the user database of the recommender system has a part, in which the user database additionally comprises user related information about user preferences in respect to items. For instance, that part of the user database is implemented such that it associates items of the user to user ratings, for instance numerical ratings. The user related information about user preferences in respect to items can also be based on metadata. For instance, the recommender system recognizes that a certain user frequently visits a certain homepage, for instance exhibiting a certain item group, such as mobile phones, the user related information of that part of the user profile could declare that the respective user is interested in this certain item group.

In the above sense, the user database of this embodiment can include a plurality of profiles of a single user: a first profile, the user profile, based on user related information about the single user preferences in respect to items, the first user profile expressing the recommender system's view of the single user, and a plurality of second profiles, each of which contains information which expresses another user's view of the single user. The fact that a user recommends a certain item to one of its contacts reveals the user's knowledge about certain preferences of that contact. The recommender system identifies this knowledge and uses it for automatic stimulation of further personal recommendation.

In a preferred embodiment, the recommender system is configured to update the user related information of the respective user in dependence of the user ratings.

As already elaborated above, a respective user profile of the user database can comprise a first table which associates the items through personal numerical ratings for storing user related information about user preferences in the respect to items. Alternatively or additionally, the user related information about user preferences can express a user's interest or disinterest in a group of items or other personal relationship to a specific group of items. It shall be understood that the term "table" is generally not to be construed in a literal sense but rather in a functional sense. The technical function of the first table is to associate item to user related information about user preferences in respect to items. The association can be realized by any other data structure known to the man skilled in the art and must not necessarily be implemented in the form of the first table.

In a further embodiment of the recommender system, the like-degree determiner is configured to determine a second like-degree for the specific item from one of the number of databases based on the user related information about personal preferences in respect to items and the sender is additionally configured to send an electronic recommendation signal to a respective user of the user database in dependence of the second like-degree, wherein the electronic recommendation signal indicates availability of the specific item to the respective user.

It shall be understood that the first like-degree and the second like-degree can be equal or different from each other and that the use of the wordings "first" and "second" shall not indicate a respective amplitude, but rather serve for verbally distinguishing the two like-degrees.

The electronic recommendation signal can be in the form of an electronic message, such as an e-mail or an electronic visual prompt or other electronic written notification.

In this embodiment, the recommender system additionally provides the function of conventional recommendation systems, that is: to send a direct recommendation for a specific item from a machine to a user of a computer based network.

In one embodiment, the like-degree determiner determines the first degree and/or the second like-degree based on metadata. In another embodiment, the like-degree determiner determines the first like-degree and/or the second like-degree based on collaborative filtering.

In a preferred embodiment, the recommender system comprises a second access to at least one of a number of computer based networks for updating the contact list of the contact database. As already elaborated above, the contacts of one specific user can be the contacts the specific user has on facebook.com or similar social networks. Alternatively or additionally, the contacts of a specific user are the contacts of a local address book stored on the computer of the specific user, wherein a computer of the user can be a desktop computer, a notebook, a mobile phone, or any other personal digital assistant.

In the latter preferred embodiment, the recommender system is configured to log which items have been rated, received or seen by the users and contacts of the user database. In this embodiment, the recommender engine is configured to avoid sending the electronic suggestion signal to the respective user, if the specific item, which shall be recommended by the respective user to a respective contact, has already been rated, received or seen by the respective contact or recommended by the respective user. Thus, it is avoided that a contact, who has already rated, received, or seen an item or has been recommended an item does not receive further recommendations for the same item.

In a second aspect of the present invention a computer-implemented recommending method for simulating a user of a computer based network to recommend an item to a contact of the user is presented. The computer-implemented recommending method comprises steps of:

establishing access to at least one of a number of item databases storing a plurality of user profiles, wherein a respective user profile comprises:

at least a link to a contact database, the contact database associating contacts of the user to recommended items, wherein a respective contact is associated to a number of recommended items that each have been recommended by the user to the respective contact, determining a first like-degree for a specific item from one of the number of item databases based on the recommended items, generating an electronic suggestion signal i and sending the generated electronic suggestion signal to the respective user, if the first like-degree exceeds a fixed level, the electronic suggestion signal indicating potential interest of a respective contact of the respective user in the specific item.

In a third aspect of the present invention, a computer readable medium having computer readable code means embodied thereon, said computer readable program code means being operative to cause a programmable system when executing said computer readable code means to perform the recommending method as claimed in claim 13 is presented.

In a forth embodiment of the present invention, a computer program is presented, the computer program having executable code that, when being executed on a computer, causes the computer to perform the steps of the recommending method of claim 13.

It shall be understood, that the recommender system of the first aspect of the invention, the recommending method of the second aspect of the invention, the computer readable medium of the third aspect of the invention and the computer program of the forth aspect of the invention have similar and/or identical preferred embodiments in particular as defined in the dependent claims 2 to 12.

These and other aspects of the invention will be apparent from and illustrated with reference to the embodiments described here and after.

DETAILED DESCRIPTION OF EMBODIMENTS

Figure 1:
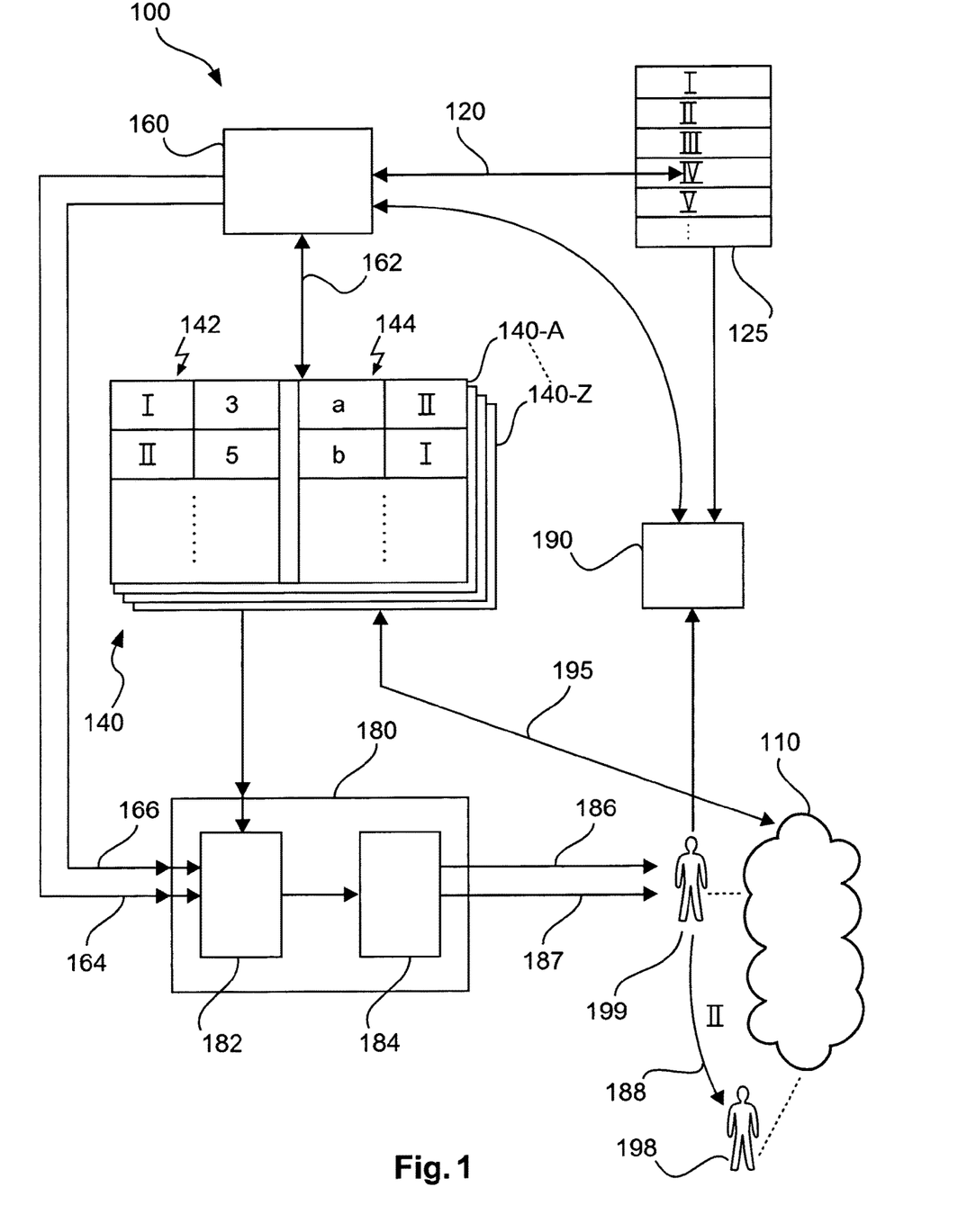
FIG. 1 shows schematically and exemplary a representation of a recommender system in accordance with the first aspect of the invention.

FIG. 1 shows schematically and exemplary a representation of a first embodiment of the recommender system 100 for stimulating a user 199 of a computer based network 110 to recommend an item, for instance item II to a contact 198 of the user 199.

The recommender system 100 comprises an access 120 to an item database 125. The item database registers or, respectively, stores a plurality of items I, II, . . . . The recommender system 100 furthermore comprises a user database 140 for storing a plurality of user profiles 140-A, . . . , 140-Z, a like-degree determiner 160 for determining a first like-degree 164, and a recommender engine 180 in the form of an automatic apparatus, which comprises a signal generator 182 and a sender 184. The sender 184 is configured to send a generated electronic suggestion signal 186 to the user 199, wherein the electronic suggestion signal indicates potential interest of contact 198 in the specific item II. In a positive case, the user 199 sends a recommendation 188 for the item II to contact 198 upon reception of the electronic suggestion signal 186.

The user database 140 of the recommender system 100 for storing the plurality of user profiles 140-A, . . . 140-Z of users A . . . Z stores, for each user, user related information about user preferences in respect to items and a contact database 144, which associates contacts a, b, . . . , to a number of recommended items I, II, wherein a respective contact, for instance contact a, is associated to a number of recommended items I, II, for instance item II that, has been recommended by the user to the respective contact. A user profile 140-A, . . . , 140-Z furthermore comprises a first table 142, which associates the items (I, II, . . . ) to personal numerical ratings for storing the user related information about user prefer-ences in respect to items. For instance, item I is rated with the numerical value of 3 by user A, whereas the item II is rated with the numerical value 5. A numerical value can express a like-degree: The higher the rating for a certain item, the more the user likes the certain item. Furthermore, user profile 140-A shows that user A has recommended item II to contact a and recommended item I to contact b. Remaining user profiles are set up in the same or in a similar manner.

Therefore, the user database 125 of the recommender system 100 includes a plurality of user profiles of a single user: a first profile based on user related information about the single user preferences in respect to items (first table 142), the first user profile expressing the recommender system's view of the single user, and a plurality of second profiles, each of which expresses another user's view of the single user (plurality of contact databases 144).

The recommender system 100 furthermore comprises a detector 190. The detector 190 is configured to detect that a new item has been added to the item database 125 and/or to detect that user 199 has rated a certain item. If a new item has been added to the item database 125 or an item has been rated by user 199, the like-degree determiner 160 determines a first like-degree for the added/rated item, in the following referred to as specific item, based on the recommended items listed in the right column of the contact database 144 in FIG. 1. Therefore, like-degree determiner comprises an access 162 to the user database.

A signal generator 182 of the recommender engine 180 is configured to generate the electronic suggestion signal 186. Only those items shall be suggested by the recommender system 100 for recommendation, which have a like-degree higher than a fixed level and which the potential recommender, that is user 199, has a certain personal relationship to. Otherwise, the recommendation 188 made by user 199 to contact 198 would be misplaced (the contact 198 has no interest in the recommended item) or would be not personal (user 199 has no personal relationship to the item he recommends).

The recommender system 100 also comprises a second access 195 to the computer based network 110, which can be for instance a social network, which allows the recommender system 100 to update the contact database with contacts of a respective user.

The recommender system 100 is also configured to update the first table 142 and the contact database 144 in dependence of user ratings made by user 199 and in dependence of recommendations which user 199 transmits to contact 198.

The like-degree determiner 160 is additionally configured to determine a second like-degree for a specific item of the database 125 based on the items that are listed in the first table 142. If the second like-degree 166 exceeds a second fixed level, the sender 184 of the recommender engine 180 sends an electronic recommendation signal 187 to user 199. It shall be understood, though, that the primary function of the recommender engine is to send said electronic suggestion signal to user 199, and that this primary function can be implemented without the optional feature of sending direct recommenda-tion signals to user 199.

In the following, some possible operating mechanisms of the recommender system are described:

When a user A sends a recommendation for an item IV to his contact b, the recommender systems 100 associates a positive rating for item IV and contact b in the contact database 144 and in this way builds a profile for contact b as seen by user A. It assumes that user A has decided to recommend the item IV to contact b because user A knows his contact b's preferences.

Later, when user A positively rates an item VI similar to item IV, that is: the first like-degree is higher than the fixed level, the recommender system 100 suggests to user A to send a recommendation about item VI to contact b, thus stimulating viral spread of users' recommendations. The recommendation system 100 could have sent the recommendation about item VI to contact B directly, but contact B would be more persuaded to acquire item VI if it is endorsed by a friend. Therefore, a recommendation for an item is not given directly to a user, but when possible, another user belonging to the first user's social network is chosen depending on his profile, and prompted to suggest the item to his contact.

When user A rates an item, the recommender system 100 updates his personal profile 140-A according to the rating. This allows the recommender system 100 to learn A's preferences and provide relevant recommendations. To stimulate a viral campaign, the recommender system 100 first retrieves friends/contacts of user A via the second access 195. For each of A's contacts, the like-degree determiner 160 determines the first like-degree for the specific item based on the recommended items, that is: based on the contact profiles as seen by user A, which is stored in the contact database 144. Based on the first like-degrees, the contacts associated to recommended items exhibiting a sufficiently high first like-degree (e.g. based on a fixed threshold) are selected. Alternatively, a minimum number of contacts are selected with the highest first like-degrees. It is also possible that the recommender system 100 refines the number of contacts by choosing such contacts who are considered to influential, as described above. The recommender system 100 then suggests to selected user A to send to these contacts a recommendation for the specific item. User A then decides to which contacts he actually wants to send the recommendation for the specific item. The recommender system 100 updates the profiles of these contacts as seen by user A, that is: the contact database 144, accordingly: if user A actually sends the suggestion to his contact/friend, the profile of this friend "as seen by A" is updated with a positive rating for the specific item, if not, with a negative rating.

When a new item X is added to the item database 125, the recommender system 100 selects a set of users who may like the new item X based on the user profiles 140A, . . . , 140-Z. Subsequently, the new item X is recommended to them. Regardless of whether the selected users will actually provide a rating for the new item X, the recommender system 100 retrieves the contacts for each of the selected users from their social network via the second access 195. Thereby, the recommender system 100 maintains a list of users who have already received a notification/recommendation/suggestion for the new item X in order to prevent presenting twice the same item to the same user. The recommender system 100 then suggests to the users, who have firstly been provided with a system recommendation, to personally recommend the new item X to the remaining contacts, if additionally a respective first like-degree exceeds the fixed level.

Figure 2:
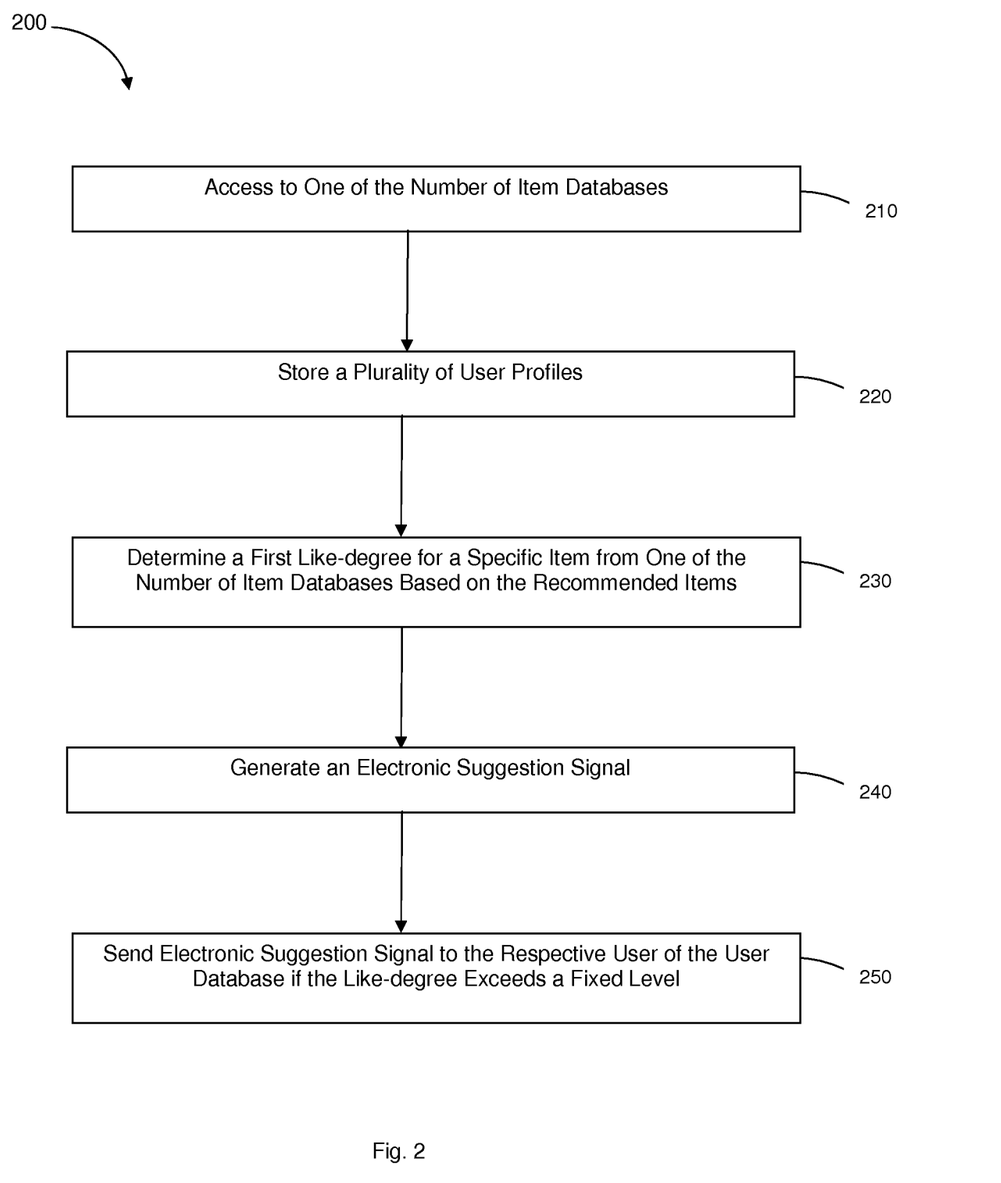
FIG. 2 shows schematically and exemplary a representation of a first embodiment of the computer-implemented recommending method in accordance with the second aspect of the invention, FIG. 3 show schematically and exemplary a representation of a second embodiment of the computer-implemented recommending method in accordance with the second aspect of the invention

FIG. 2 shows exemplary in a general way a flow chart illustrating an embodiment of the computer-implemented recommending method 200 for stimulating a user of a computer based network to recommend an item to a contact of the user. In a first step 210, of the first embodiment of the computer-implemented method 200, an access to one of the number of item databases is established. In a second step 220, a plurality of user profiles is stored, wherein a respective user profile comprises:

at least a link to a contact database, the contact database associating contacts of the user to recommended items, wherein a respective contact is associated to a number of recommended items that each have been recommended by the user to the respective contact.

In a third step 230, a first like-degree for a specific item from one of the number of item databases based on the recommended items is determined. In a forth step 240, an electronic suggestion signal is generated. In a fifth step 250, the generated electronic suggestion signal is sent to the respective user of the user database, if the first like-degree exceeds a fixed level. The electronic suggestion signal indicates potential interest of a respective contact of the respective user in the specific item.

Figure 3:
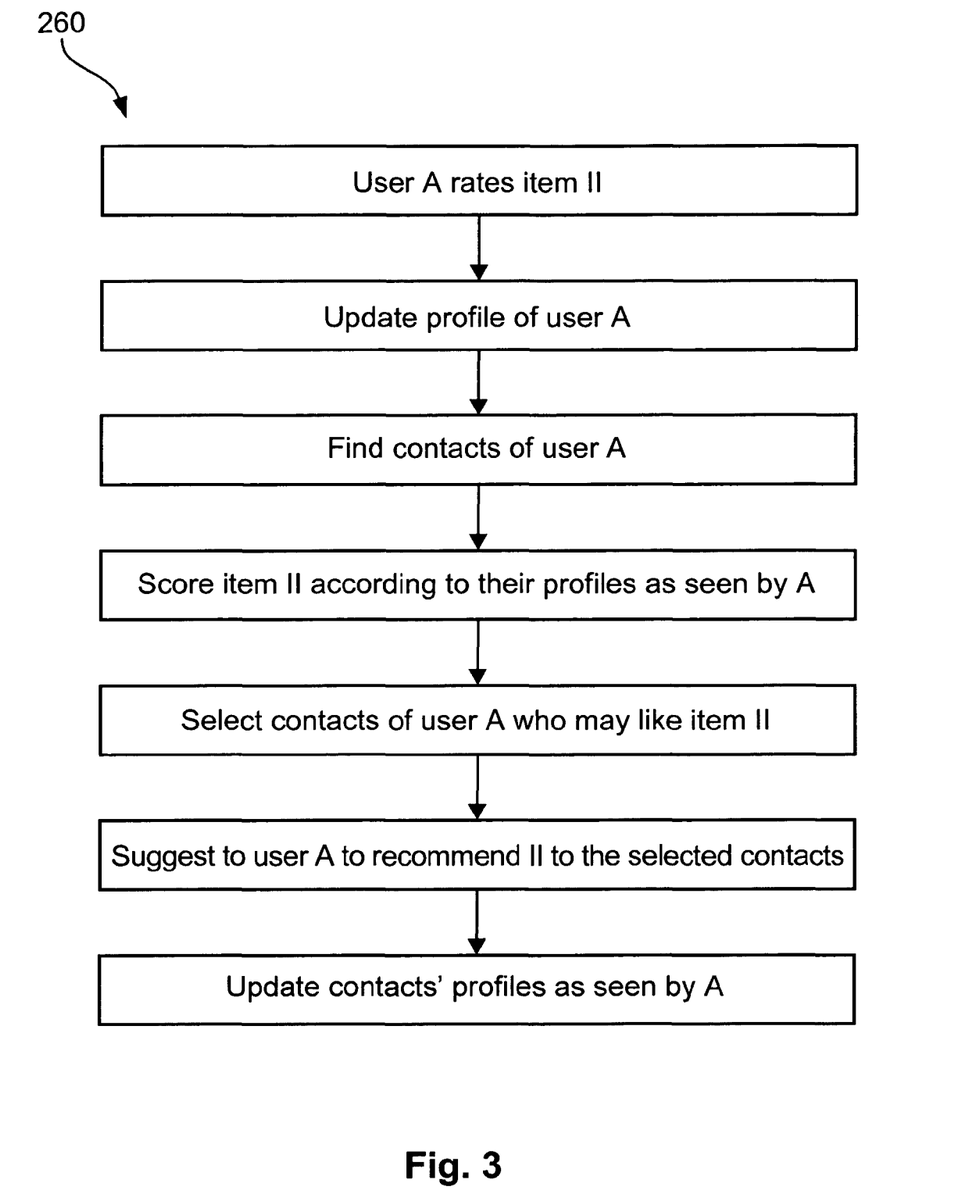
Figure 4:
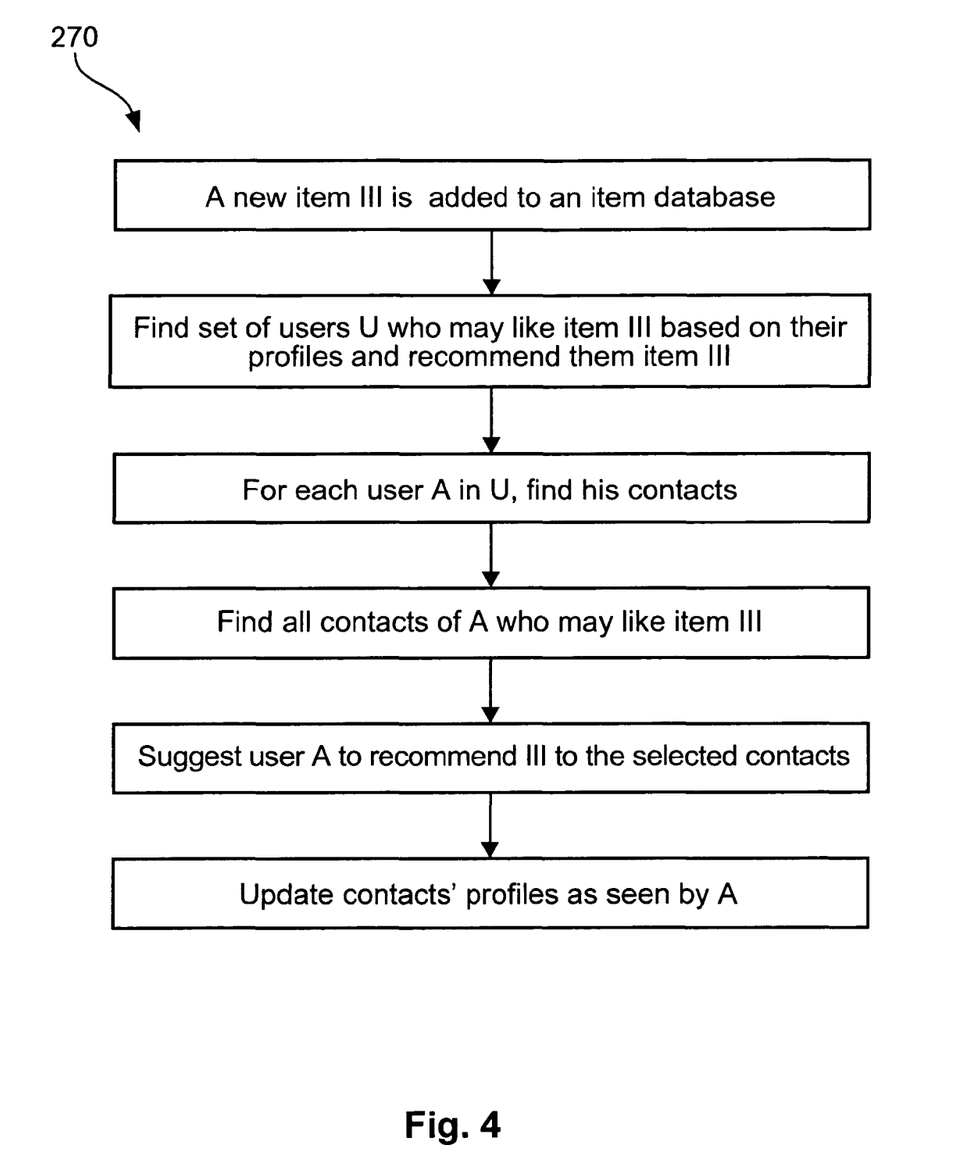
FIG. 4 shows schematically and exemplary a representation of a third embodiment of the computer-implemented recommending method in accordance with the second aspect of the invention.

FIGS. 3 and 4 show more specific implementations of the computer-implemented recommending method of the second aspect of the invention.

FIG. 3 shows a second embodiment of the computer-implemented recommending method of the second aspect of the invention. In a first step, it is detected that user A has rated an item II. Then, the profile of user A is updated according to his rating. This corresponds to updating the first table 142 shown in FIG. 1 and allows to learn preferences of user A and to provide relevant recommendations to him. In order to stimulate personal recommendations, contacts of user A are retrieved. For each of user A's contacts, the item II is scored using the contacts profile as seen by user A. Scoring in that sense means, that the first like-degree for the item II based on the recommended items, user A has recommended to his contacts, is determined. Based on the scores, that is to say: on the first like-degrees, the contacts that have sufficiently high a score/first like-degree, for instance based on a fixed threshold, are selected. Alternatively, a minimum number of contacts can be selected with the highest scores/first like-degrees.

It is then suggested to user A to send to the selected contacts a recommendation for item II. This suggestion occurs with means of the electronic suggestion signal, for instance in the form of an electronic message or an electronic prompt. User A then decides to which contact he actually wants to send the recommendation for item II. The profiles of the selected contacts as seen by user A are updated accordingly: If user A actually sends the recommendation to his contact, the profile of this contact as seen by A is updated with a positive rating for item II, if not, with a negative rating.

FIG. 4 shows a third embodiment 270 of the computer-implemented recommending method in the case when a new item is added to an item database, for example to start a new viral campaign.

First, it is detected that a new item III has been added to an item database. According to the stored user related information about user preferences, for instance in the form of a first table associating items to personal ratings as shown in FIG. 1 and referenced to with reference number 142, a set of users U is found who may like item III. Consequently, item III is recommended to the set of users U. Regardless of whether the selected users U will actually provide a rating for item III, for each of the set of users U, the contacts from their social networks are retrieved. In this step, a list of users, who have already received a recommendation for item III or have already rated item III is maintained in order to prevent presenting twice the same item to the same user. The next steps of the third embodiment of the computer-implemented recommending method 270 are identical to the last steps of the second embodiment of the computer-implemented recommending method detected in FIG. 3.

It shall be understood that the recommender system of the first aspect of the invention is configured to implement the methods described with respect to FIGS. 2, 3 and 4. It shall furthermore be understood that the above described steps of the methods 200, 260 and 270 can be executed in a order deviating from the orders described above. Some or all steps can be performed simultaneously.

It shall also be understood that an arrangement of elements of a respective figures predominately serves the purpose of an evident description; it does not relate to any actual geometric arrangement of parts of manufactured system according to the invention.

Referring in particular to the recommender system, the user database, recommender engine, like-degree determiner and item database can be an open system and thus not be integrated in a single housing.

The computer program of this aspect of the invention may be stored/distributed on a suitable medium, such as an optical storage medium or a solid state storage medium or together with or as powered of other hardware, but may also be distributed in other forms, such as via the internet or other wired or wireless telecommunication systems.

In the claims, the word "comprising" does not exclude other elements or steps, and the indefinite article "a" or "an" does not exclude a plurality.

A single unit or device may fulfill the function of several items recited in the claims. The fact that certain measures are cited in a mutually different dependent claims does not indicate that a combination of these measures can not be used to advantage.

Reference signs in the claims should not be construed as limiting the scope.

The present invention is related to a recommender system, a computer-implemented recommending method, a corresponding computer readable medium and a corresponding computer program. A recommender system is configured to send an electronic suggestion signal to a respective user of a user database in dependence of a first like-degree of a specific item, which has been determined based on items that the respective user has already recommended to his contacts. The electronic suggestion signal suggests the respective user to recommend the specific item to one or more of his contacts. In that way, personal based recommendations are stimulated.

LIST OF REFERENCES 100 recommender system
110 computer based network
120 access to at least one of a number of item databases
125 item database
140 user database
140-A one of the plurality of user profiles
140-Z another of the plurality of user profiles
142 first table
144 contact database
160 like-degree determiner
162 access to user database
164 first like-degree
166 second like-degree
180 recommender engine
182 signal generator
184 sender
186 electronic suggestion signal
187 electronic recommendation signal
188 personal recommendation
190 detector
195 second access
198 contact
199 user
200 first embodiment of the computer-implemented recommending method
210 establishing access to a database
220 storing a plurality of user profiles
230 determining a first like-degree
240 generating an electronic suggestion signal
250 sending the generated electronic suggestion signal
260 second embodiment of the computer-implemented recommending method
270 third embodiment of the computer-implemented recommending method

The invention claimed is:

1. A recommender system for use in maintaining a user database storing user profiles and in controlling communication of electronic suggestion signals to users in a computer based network, the recommender system comprising:
a user database stored on a computer for storing and updating a plurality of user profiles, wherein a user profile of a given user comprises:
a contact database associating contacts of the given user to recommended items, wherein the recommender system is configured to update the plurality of user profiles by storing in the contact database the recommended items comprising, video items or TV shows, that have been notified to at least a given one of the contacts by the given user in the form of electronic notification signals;
a signal generator configured to generate an electronic suggestion signal for a specific video item or specific TV show;
a sender that is coupled to the signal generated and is configured to send the generated electronic suggestion signal to the given user;
a sending detector that is configured to detect whether or not the given user has notified, in the form of electronic notification signals, the given contact of the specific video item or specific TV show, wherein the recommender system is further configured to update the plurality of user profiles by associating the given contact in the contact database to non-recommended items, wherein the non-recommended items are the specific video items or the specific TV shows which the sending detector detects as not being notified by the given user of the user database to the given contact in response to the electronic suggestion signal, and to prevent sending the electronic suggestion signal to the given user when the given contact of the given user is associated in the contact database with the specific video item or specific TV show as one of the recommended items.

2. The recommender system according to claim 1, wherein the recommender system is configured to mark the non-recommended items as non-recommended in the contact database.

3. The recommender system according to claim 1, wherein the user database additionally comprises user-related information about user preferences in respect to the video items or TV shows and wherein the signal generator is configured to generate the electronic suggestion signal in dependence of the user related information of the given user.

4. The recommender system according to claim 3, wherein the recommender system is configured to update the user related information of the respective user in dependence of a user rating.

5. The recommender system according to claim 3, wherein the given user profile of the user database comprises a first table which associates the items to personal numerical ratings and stores the first table as the user related information about the user preferences in respect to the video items or TV shows.

6. The recommender system according to claim 1, comprising a second access to at least one of a number of computer based networks for updating a contact list of the contact database.

7. The recommender system according to claim 1, wherein
the recommender system is configured to log which of the video items or TV shows have been rated, received or seen by the users and the contacts of the user database and
the recommender engine is configured to additionally prevent sending the electronic suggestion signal to the given user, if the specific video item or the specific TV show, which shall be recommended by the given user to the given contact, has already been rated, received or seen by the given contact.

8. A method of maintaining a user database storing user profiles and of controlling communication of electronic suggestion signals to users in a computer based network, the method comprising the steps of:
storing and updating, by a computer, a plurality of user profiles in a user database, wherein a user profile of a given user comprises a contact database associating contacts of the given user to recommended items, wherein the updating the plurality of user profiles comprises storing in the contact database the recommended items comprising video items or TV shows that have been notified to at least a given one of the contacts by the given user in the form of electronic notification signals;

generating, by the computer, an electronic suggestion signal for a specific video item or specific TV show for the given contact of the given user;

sending, by the computer, the generated electronic suggestion signal to the given user;

detecting, by the computer, whether or not the given user has notified, in the form of electronic notification signals, the given contact of the specific video item or the specific TV show; wherein updating, by the computer, the plurality of user profiles further comprises associating the given contact in the contact database to non-recommended items, wherein the non-recommended items are the specific video items or the specific TV shows which the detecting step detects as not being notified by the given user of the user database to the given contact in response to the electronic suggestion signal; and preventing, by the computer, the sending of the electronic suggestion signal to the given user when the given contact of the given user is associated in the contact database with the specific video item or specific TV show as one of the recommended items.

9. The method according to claim 8, including marking the non-recommended items as non-recommended in the contact database.

10. The method according to claim 8, wherein the user database additionally comprises user-related information about user preferences in respect to the video items or TV shows and generating the electronic suggestion signal in dependence of the user related information of the given user.

11. The method according to claim 10, including updating the user related information of the respective user in dependence of a user rating.

12. The method according to claim 10, wherein the given user profile of the user database comprises a first table which associates the items to personal numerical ratings and stores the first table as the user related information about the user preferences in respect to the video items or TV shows.

13. The method according to claim 8, including accessing at least one of a number of computer based networks for updating a contact list of the contact database.

14. The method according to claim 8, including logging which of the video items or TV shows have been rated, received or seen by the users and the contacts of the user database, and additionally prevent sending the electronic suggestion signal to the given user, if the specific video item or the specific TV show, which shall be recommended by the given user to the given contact, has already been rated, received or seen by the given contact.

* * * * *